United States Patent
Keech

(10) Patent No.: US 6,269,701 B1
(45) Date of Patent: Aug. 7, 2001

(54) ELECTROMAGNETIC FLOWMETER DERIVING POWER FROM SIGNALLING LOOP CURRENT

(75) Inventor: Ray Keech, Stonehouse (GB)

(73) Assignee: ABB Instrumentation Limited, Huntingdon (GB)

(*) Notice: Subject to any disclaimer, the term of this patent is extended or adjusted under 35 U.S.C. 154(b) by 0 days.

(21) Appl. No.: 09/216,695

(22) Filed: Dec. 18, 1998

(30) Foreign Application Priority Data

Dec. 19, 1997 (GB) .................................................. 9726913

(51) Int. Cl.[7] ....................................................... G01F 1/60
(52) U.S. Cl. ................................. 73/861.16; 73/861.12; 73/861.08; 73/861.11
(58) Field of Search ........................... 73/861.11, 861.08, 73/861.12–861.17

(56) References Cited

U.S. PATENT DOCUMENTS

| | | | |
|---|---|---|---|
| 3,764,880 | * 10/1973 | Rose | 363/22 |
| 3,906,338 | * 9/1975 | Grindheim | 323/293 |
| 3,955,413 | 5/1976 | Steele . | |
| 4,059,014 | * 11/1977 | Torimaru | 73/861.16 |
| 4,373,400 | * 2/1983 | Sekiguchi | 73/861.12 |
| 4,766,770 | 8/1988 | Mannherz et al. . | |
| 4,969,363 | * 11/1990 | Mochizuki | 73/861.17 |
| 5,079,957 | * 1/1992 | Wehrs | 73/861.17 |
| 5,436,824 | 7/1995 | Royner . | |
| 5,639,970 | * 6/1997 | Schulz | 73/861.12 |

FOREIGN PATENT DOCUMENTS 0 485 135 A1   4/1991   (EP) .

* cited by examiner

Primary Examiner—Benjamin R. Fuller
Assistant Examiner—Jagdish Patel
(74) Attorney, Agent, or Firm—Larson & Taylor, PLC

(57) ABSTRACT

An improvement over conventional electromagnetic flowmeters which signal a measure of flow rate by controlling the current in a current signalling loop (also known as a sensing loop) and in which power for the flowmeter is derived from the current in the signalling/sensing loop. Conventional electromagnetic flowmeters use a standard current range (typically 4–20 mA), in which zero flow is indicated by controlling the current in the loop to a minimum predeterimened value and maximum flow is indicated by controlling the current to a maximum predetermined value. In the improved flowmeter of the invention, minimum flow is signalled by maximum current in the signalling/sensing loop and maximum flow is signalled by minimum current. This has been found to enable improved accuracy to be obtained at low flow rates without requiring complex flowmeter circuitry.

16 Claims, 1 Drawing Sheet

ELECTROMAGNETIC FLOWMETER DERIVING POWER FROM SIGNALLING LOOP CURRENT

BACKGROUND OF THE INVENTION

1. Field of the Invention

The preset application relates to electromagnetic flowmeters. Electromagnetic flowmeters are used in a variety of applications. As is well known, they operate by providing a current to a coil to generate a magnetic field in the fluid to be monitored, and detecting a voltage, generated across the fluid, which is generally proportional to the product of the magnetic field strength and the flow velocity.

2. Description of Prior Art

A common method of signalling the flow rate is for the flowmeters to control the current flowing in a current signalling loop (also sometimes referred to as a sensing loop or simply a current loop), the magnitude of the current in the current sensing loop indicating the rate of fluid flow, the current being arranged to flow in a current signalling loop incorporating a display or other metering apparatus remote from the sensor probe of the flowmeter. Commonly, a current output in the current signalling loop in the range of 4–20 mA is used; a current of 4 mA indicating zero rate of flow, and 20 mA indicating a full rate of flow, the scale typically being linear.

It has recently been proposed to power an electromagnetic flowmeter from the output current flowing in the current signalling loop. This has the benefit of two-wire operation; the meter power and output signal are conveyed along the same pair of wires. The power constraints in such a flowmeter are very severe, however.

One recent proposal attempts to make powering a meter from a current signalling loop feasible by reducing power consumption at lower flow rates, when the current flowing in the current signalling loop will be smaller, by cycling measurement, and only measuring for short cycles at low flow rates to conserve power. This requires complicated control circuitry, adding to the cost of the flowmeter.

In addition, the above-described proposal is believed to make use of the fact that a typical voltage available in the current signalling loop is about 24V. However, the inventor considers it better practice to provide a flowmeter which will reliably control the current signalling loop with a voltage drop of only about 10V across the flowmeter, to ensure reliable operation when several devices are connection in series in the same current signalling loop. This however would allow only about 40 mW to operate the sensor at low flow rates, and the above described proposal may not function reliably at such low power levels.

This disadvantage is compounded, as the inventor has realised, by the fact that it is particularly when the flow rate is lowest that it is most difficult to obtain reliable measurements with a high signal-to-noise ratio; the signal generated by such a flowmeter is generally proportional to the coil current applied to the coil and to the flow velocity, and at low velocities, the signal will be small for a given coil current.

Thus, where power is limited, it is difficult to obtain a good signal-to-noise ratio at low flow levels. This problem is particularly pronounced in the prior art current signalling loop-powered flowmeter, in which the available power drops as the rate of fluid flow drops. Although practical improvements on the prior art may be achieved, with attendant cost and complexity, by further attempts to reduce power consumption of the elctronics and optimisation of the switching algorithms, the inventor has appreciated that, owing to the problems at low flow rates, the performance of such current signalling loop powered flowmeters is inherently limited. The inventor has proposed a novel alternative which is both simpler to implement and can provide better results, particularly at low flow rates.

SUMMARY OF THE INVENTION

The invention provides an electromagnetic flowmeter having means for controlling an electrical current flowing in a signalling loop to a value indicative of the rate of flow of fluid at a measuring location, and means for drawing power from said current to operate the flowmeter, characterised in that the control means is arranged to increase the current as the rate of fluid flow decreases whereby more power can be drawn at lower flow rates than at high flow rates.

With this elegant solution, the power available for operation of the flowmeter increases as the measured flow rate decreases. In this way, for example, the flowmeter coil current may be increased at lower flow rates. As an alternative, more measurements may be taken at lower flow rates and the results combined or averaged. (This latter method may be directly contrasted with the fewer measurements taken in the prior art at lower flow rate.) In each case, the resultant measurement should have a higher signal to noise ratio than that obtainable by taking a single measurement at a constant value of coil current. Thus the decrease in the signal to noise ratio caused by drop in flow velocity that would otherwise occur can be compensated for.

At first sight, a potential drawback of the invention is that it is necessary to connect the flowmeter to a modified display or monitoring device, arranged to recognise a low current in the current signalling loop as indicative of a high flow rate and a high current in the current signalling loop as indicative of a low flow rate. However, the inventor has appreciated that most conventional display or monitoring devices can be modified to operate in this manner without undue difficulty; if the monitoring device simply comprises an analogue meter, it is merely necessary to reverse the scale, and in commonplace computerised electronic monitoring equipment, it is typically only necessary to alter the software processing performed on the signal obtained from electronic measuring circuits associated with the current signalling loop of the flowmeter, or failing that, to make minor modifications to the circuitry. Thus, in fact, little difficulties are caused in practice by this reversal of the current charcteristic.

The invention also provides a current loop sensing device adapted for use with an electromagnetic flowmeter having a negative current against flow rate characteristic, the sensing device having means for monitoring current flowing in a current signalling loop and processing means for obtaining a measure of flow rate from the current flowing in the current signalling loop, the apparatus being arranged to produce a measure of flow rate which decreases as the current in the current signalling loop increases.

In order that the invention may be clearly understood and readily carried into effect, one embodiment thereof will now be described, by way of example only, with reference to the accompanying drawing, which shows, in schematic outline form, apparatus in accordance with one example of the invention.

DETAILED DESCRIPTION OF PREFERRED EMBODIMENT

Figure 1:
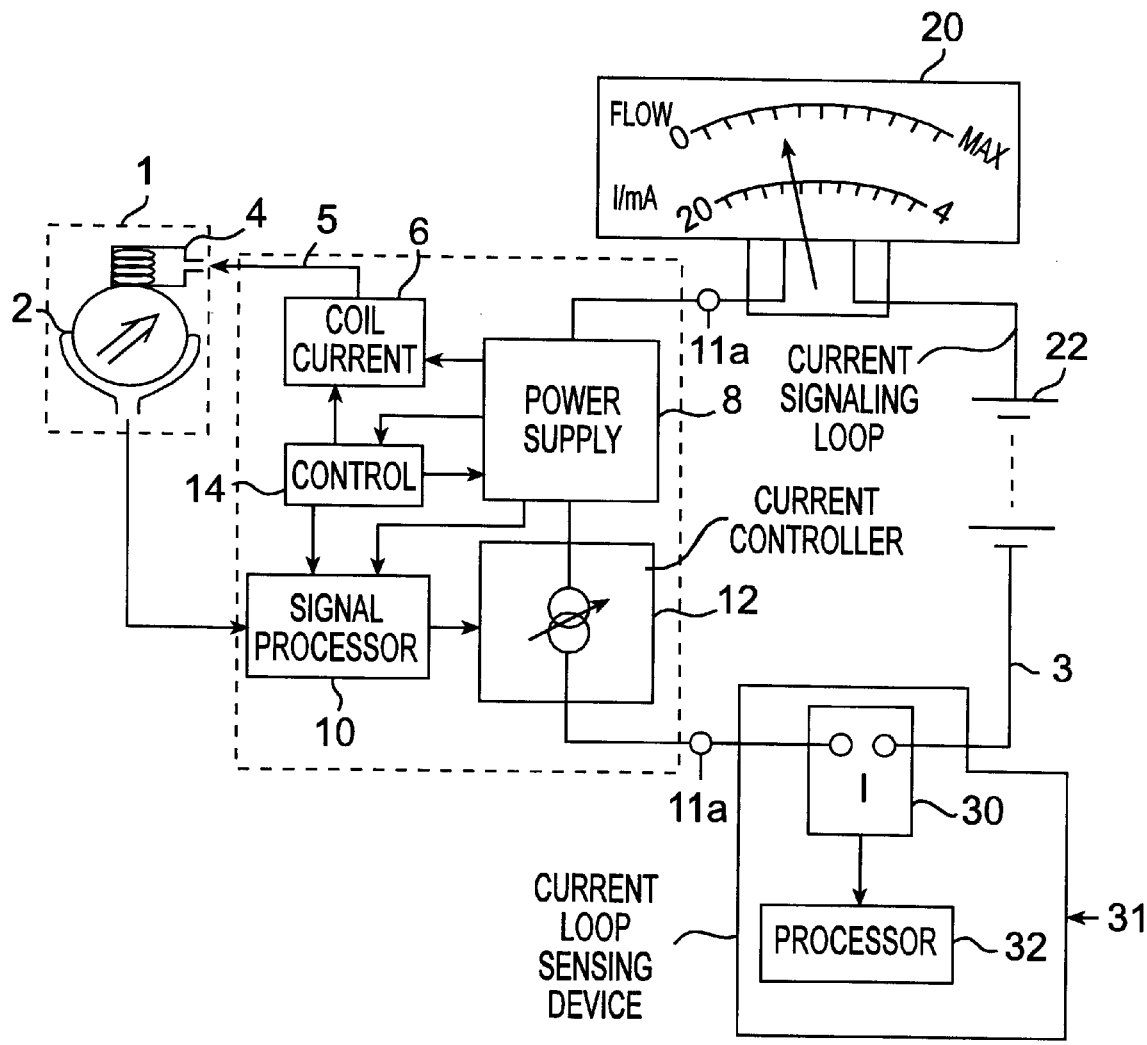
FIG. 1 schematically depicts a flowmeter in accordance with an embodiment of the invention.

Referring now to the drawing, a flowmeter sensor 1 is located in the path of fluid along a pipeline (not shown). The probe senses a voltage induced in electrodes 2 across the fluid in response to a magnetic field generated in the fluid by means of a coil 4. The coil is supplied with a controlled coil current 5 from coil current supply 6, which in turn derives power from a power supply unit 8 which derives power from the current signalling loop 3 which flows between two terminals 11a and 11b of the flowmeter. The power supply 8 also provides power to the other components, to be described below. Not shown, a battery may be included in the power supply 8 to supplement the power available from the current signalling loop 3; in such a case, the life of the battery will be considerably extended, or its capacity may be reduced, by making use of the power available from the current signalling loop 3. Preferably, however, all power required for normal operation of the flowmeter is drawn from the current signalling loop 3. Note however that, if necessary, a small capacity battery or a capacitor may be provided to maintain power to a memory storing configuration or calibration parameters, or to other electronic control circuitry in the absence of current signalling loop current, for example due to a failure in the remote metering equipment.

The induced voltage in the electrodes 2 is detected by signal processor 10, the output of which is connected to current signalling loop current controller 12, to control the current flowing through the current signalling loop 3. Operation of the apparatus is generally controlled by a microprocessor-based controller 14, which is arranged to adjust coil current 5 by means of coil current controller 6 to optimise measurement accuracy and power consumption, and to calibrate the signal accordingly. It is possible for the signal processor 10 to produce an output signal (voltage or current) which increases as flow rate decreases, to drive a current signalling loop current controller 12 with a positive characteristic; this is preferred, particularly where the signal processing and control functions are integrated and performed in part by a microprocessor. Alternatively, the current signalling loop current controller 12 may be designed to have a negative characteristic. The distribution is not critical, provided that the overall effect is to produce a current signalling loop current which decreases as flow rate increase in a known manner, preferably in a linear fashion, as this may simplify processing, both in the flowmeter and in measuring apparatus in the current signalling loop.

According to the invention therefore, there is inversion of the conventional relationship between flow rate and current so that the current generated at zero flow rate is about 20 mA and this decreases substantially linearly to about 4 mA at the full flow rate. By this means, there is adequate power available to enable good signal-to-noise performance to be achieved at low flow rates, and any deficit of operational power occurs at maximum flow rates, where signal-to-noise problems are not so critical. The apparatus is preferably arranged to maintain a minimum current (for example about 4 mA) for flowrates exceeding the maximum flowrate which the meter was designed to measure; this ensures that power remains available even in the event of a surge in fluid flow. It will be appreciated that maintenance of a minimum current can be achieved in a variety of ways, by limiting the maximum reading of flow rate supplied to the current signalling loop current controller or by limiting the minimum current output of the current signalling loop current controller, and will typically be integrated into the signal processor 10 which processes the voltage obtained form the fluid.

In the illustrated embodiment, the meter is incorporated in a current signalling loop comprising an analogue meter 20 being a first current loop sensing device, a power source 22, and a second current loop sensing device 31 comprising an electronic current sensing circuit 30 coupled to the input of a processor 32. The processor arranged to convert the measured current, I, to a flowrate according to the following equation:

$$\text{Flowrate} = F_{span} * \frac{I_{max} - I}{I_{max} - I_{min}}$$

where Imax, Imin and Fspan are predetermined parameters for the flowmeter, Imax is typically 20 mA, and I min is typically 4 mA. Note that. where the flowmeter incorporates logic, as in the embodiment described, the value of Fspan (and also Imax and Imin) may be programmable.

It will be appreciated that conventional meters may be included in the loop, with appropriate adaptation to recognise a low current as a high flow rate. With a computer-controlled sensing device, adaptation of the device may comprise modifying the software to implement the above equation.

Each feature described herein may be independently provided, unless otherwise stated. The appended abstract is incorporated herein by reference.

What is claimed is:

1. A current loop electromagnetic flow metering system comprising:

an electromagnetic flowmeter for measuring a rate of flow of a fluid at a measuring location connected in a current signalling loop, the electromagnetic flowmeter comprising:

a coil for generating a magnetic field in said fluid at the measuring location;

a coil current supply connected to the coil for supplying current to said coil;

electrodes in the fluid at the measuring location for detecting a voltage generated across the flow;

a signal processor having an input connected to the electrodes for detecting the voltage generated across the electrodes;

power supply circuitry connected in the current signalling loop for drawing power from the current signalling loop, connected to the coil current supply to supply power thereto, and connected to the signal processor to supply current thereto; and a current signalling loop current controller for controlling the current in the current signalling loop to a value indicative of the rate of fluid flow based on an output of the signal processor, the current signalling loop current controller controlling a current in the current signalling loop to a predetermined minimum value at a predetermined maximum rate of flow of said fluid and controlling the current in the current signalling loop to a predetermined maximum value at a minimum or zero rate of flow of said fluid;

a current loop sensing device having current sensing circuitry for sensing current flowing in the current signalling loop and producing an output flow rate value representative of rate of flow of said fluid; and a power source connected to the current signalling loop for supplying power to the current signalling loop.

2. An electromagnetic flowmeter for measuring a rate of flow of a fluid at a measuring location arranged for connection in a current signalling loop, the electromagnetic flowmeter comprising:
   a coil for generating a magnetic field in said fluid at the measuring location;
   a coil current supply connected to the coil for supplying current to said coil;
   electrodes in the fluid at the measuring location for detecting a voltage generated across the flow;
   a signal processor having an input connected to the electrodes for detecting the voltage generated across the electrodes;
   power supply circuitry connected in the current signalling loop for drawing power from the current signalling loop, connected to the coil current supply to supply power thereto, and connected to the signal processor to supply current thereto;
   a current signalling loop current controller for controlling a current in the current signalling loop to a value indicative of the rate of flow of said fluid based on an output of the signal processor, the current signalling loop current controller controlling the current in the current signalling loop to a predetermined minimum value at a predetermined maximum rate of flow of said fluid and controlling the current in the current signalling loop to a predetermined maximum value at a minimum or zero rate of flow of said fluid; and
   a control element operatively coupled to the coil current supply and the power supply to cause the coil current supply to supply a greater current to the coil at a lower rate of flow of said fluid than at a higher rate of flow of said fluid.

3. An electromagnetic flowmeter for measuring a rate of flow of a fluid at a measuring location arranged for connection in a current signalling loop, the electromagnetic flowmeter comprising:
   a coil for generating a magnetic field in said fluid at the measuring location;
   a coil current supply connected to the coil for supplying coil current to said coil;
   electrodes in the fluid at the measuring location for detecting a voltage generated across the flow;
   a signal processor having an input connected to the electrodes for detecting the voltage generated across the electrodes;
   power supply circuitry connected in the current signalling loop for drawing power from the current signalling loop, connected to the coil current supply to supply power thereto, and connected to the signal processor to supply current thereto; and
   a current signalling loop current controller connected in the current signalling loop for controlling a current in the current signalling loop to a value indicative of the rate of flow of said fluid based on an output of the signal processor, the current signalling loop current controller controlling the current in the current signalling loop to a predetermined minimum value at a predetermined maximum rate of flow of the fluid and controlling the current in the current signalling loop to a predetermined maximum value at a minimum or zero rate of flow of said fluid.

4. An improved electromagnetic flowmeter for measuring a rate of flow of a fluid at a measuring location having two terminals for connection in a current signalling loop and comprising a coil for generating a magnetic field in the fluid at the measuring location; a coil current supply connected to said coil for supplying coil current to said coil, electrodes in the fluid at the measuring location for detecting a voltage generated across the flow; a signal processor connected to the electrodes for detecting the voltage generated across the electrodes, power supply circuitry connected in the current signalling loop for drawing power from the current signalling loop to power the coil current supply and the signal processor; and a current signalling loop current controller connected in the current signalling loop and for controlling a current in the current signalling loop to a value indicative of the rate of flow of said fluid based on an output of the signal processor, the power supply circuitry and the current signalling loop current controller being coupled between the terminals for connection in the current signalling loop, wherein the improvement comprises:
   the current signalling loop current controller is connected to the current signalling loop and to the output of the signal processor to increase the current in the current signalling loop as the rate of flow of said fluid decreases and decreases the current in the current signalling loop as the rate of flow of said fluid increases.

5. An improved electromagnetic flowmeter according to claim 4, further including a control element operatively coupled to the coil current supply to control the coil current supply to supply a greater coil current to said coil for generating a magnetic field at a lower rate of flow of said fluid than at a higher rate of flow of said fluid.

6. An improved electromagnetic flowmeter according to claim 5, wherein the coil current supply is controlled to switch between two or more discrete values of coil current in dependence on a measure of the rate of flow of said fluid.

7. An improved electromagnetic flowmeter according to claim 5, wherein the coil current supply is controlled to vary the coil current substantially continuously over at least a range of rates of flow of said fluid.

8. An improved electromagnetic flowmeter according to claim 4, wherein the current signalling loop current controller is connected to vary the current in the current signalling loop substantially linearly with the rate of flow of said fluid, with a negative characteristic, within a defined range of rates of flow of said fluid.

9. An improved electromagnetic flowmeter according to claim 4, wherein the current signalling loop current controller maintains the current in the current signalling loop substantially at a defined minimum value if the rate of flow of said fluid exceeds a defined maximum flow rate.

10. An improved electromagnetic flowmeter according to claim 4, wherein the current signalling loop current controller controls the current in the current signalling loop to about 20 mA when the rate of flow of said fluid is substantially zero and to about 4 mA when the rate of flow of said fluid is at a predefined maximum flow rate.

11. An improved electromagnetic flowmeter according to claim 4 further comprising a current loop sensing device connected in the current signalling loop, the current loop sensing device including a current sensing circuit for sensing the current in the current signalling loop and a processor connected to the current sensing circuit to produce an output flowrate, F, depending on the current in the current signalling loop, I, and wherein the processor is configured so that the flowrate of said fluid is related to the current in the current signalling loop according to the following equation:

$$\text{Flowrate} = F_{span} * \frac{I_{max} - I}{I_{max} - I_{min}}$$

wherein Fspan, Imax, and Imin are predetermined parameters.

12. An improved current loop sensing device arranged for connection in a current signalling loop, the current loop sensing device having current sensing circuitry for sensing current flowing in the current signalling loop, the improvement comprising:
a processor arranged to produce an output flow value representative of a rate of flow of a fluid having a predetermined maximum value at a predetermined minimum value of the current in the current signalling loop and wherein said output flow value decreases according to a predetermined function, as the current in the current signalling loop increases.

13. A current loop sensing device according to claim 12 wherein the predetermined function is a linear function.

14. An improved current loop sensing device arranged for connection in a current signalling loop of an electromagnetic flowmeter and having current sensing circuitry for sensing a current flowing in the current signalling loop, the improvement comprising:
a processor connected to the current sensing circuitry to produce an output flowrate, F, depending on the current flowing in the current signalling loop, I, according to the following equation:

$$\text{Flowrate} = F_{span} * \frac{I_{max} - I}{I_{max} - I_{min}}$$

Fspan, Imax, and Imin are predetermined parameters.

15. An improved current loop sensing device according to claim 14, wherein any one of Fspan, Imax and Imin is programmable.

16. A method of adapting a current loop sensing device for use with an improved electromagnetic flow meter in which a current flowing in a current signalling loop in which the current decreases as a rate of flow increases, the current loop sensing device initially being arranged to produce an output indicative of flow rate which increases as the current flowing in the current signalling loop increases, the method comprising the steps of: re-configuring the current loop sensing device to produce an output which has a predetermined maximum value for a predetermined minimum loop current, which decreases according to a determined function as the current flowing in the current signalling loop increases and connecting the re-configured current loop sensing device to the improved electromagnetic flow meter.

* * * * *